United States Patent [19]

Wilmers

[11] 4,366,557
[45] Dec. 28, 1982

[54] CIRCUIT ARRANGEMENT FOR THE RECOGNITION OF PREDETERMINED BINARY VALVES OF A SPECIFIC MINIMUM DURATION

[75] Inventor: Gerhard Wilmers, Munich, Fed. Rep. of Germany

[73] Assignee: Siemens Aktiengesellschaft, Berlin & Munich, Fed. Rep. of Germany

[21] Appl. No.: 162,159

[22] Filed: Jun. 23, 1980

[30] Foreign Application Priority Data

Jul. 18, 1979 [DE] Fed. Rep. of Germany ....... 2929079

[51] Int. Cl.³ ............................................. G11C 13/00
[52] U.S. Cl. ..................................... 365/189; 365/230
[58] Field of Search ............... 365/174, 182, 189, 230, 365/233

[56] References Cited

U.S. PATENT DOCUMENTS 4,219,883 8/1980 Kobayashi et al. ................. 365/189

*Primary Examiner*—Terrell W. Fears
*Attorney, Agent, or Firm*—Hill, Van Santen, Steadman, Chiara & Simpson

[57] ABSTRACT

A circuit arrangement recognizes predetermined binary values of a specific minimum duration. Data from a plurality of data sources are emitted to a common data line by way of a respective switch. An address generator periodically generates data source addresses which are emitted, on the one hand, to a respective counting device and, on the other hand, to an address decoder. The address decoder decodes the data source addresses and generates corresponding switching signals which connect the data sources to the data line in temporal succession by way of the switches. The counting devices assigned counter readings to all data sources, the counter readings being changed by respective unit upon identification of the predetermined binary values. Upon attainment of predetermined counter readings, recognition signals and the assigned data source addresses are emitted.

7 Claims, 5 Drawing Figures

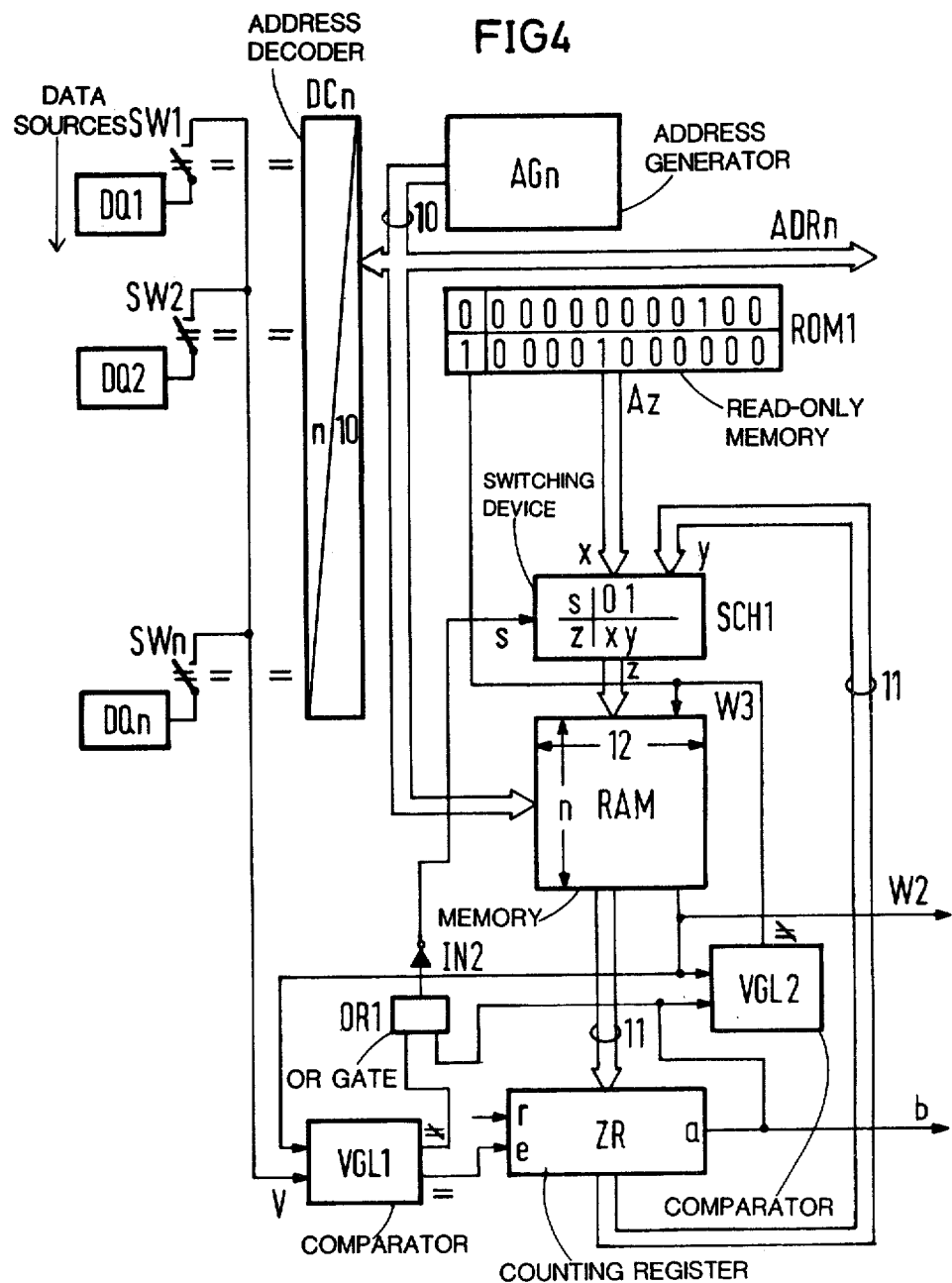

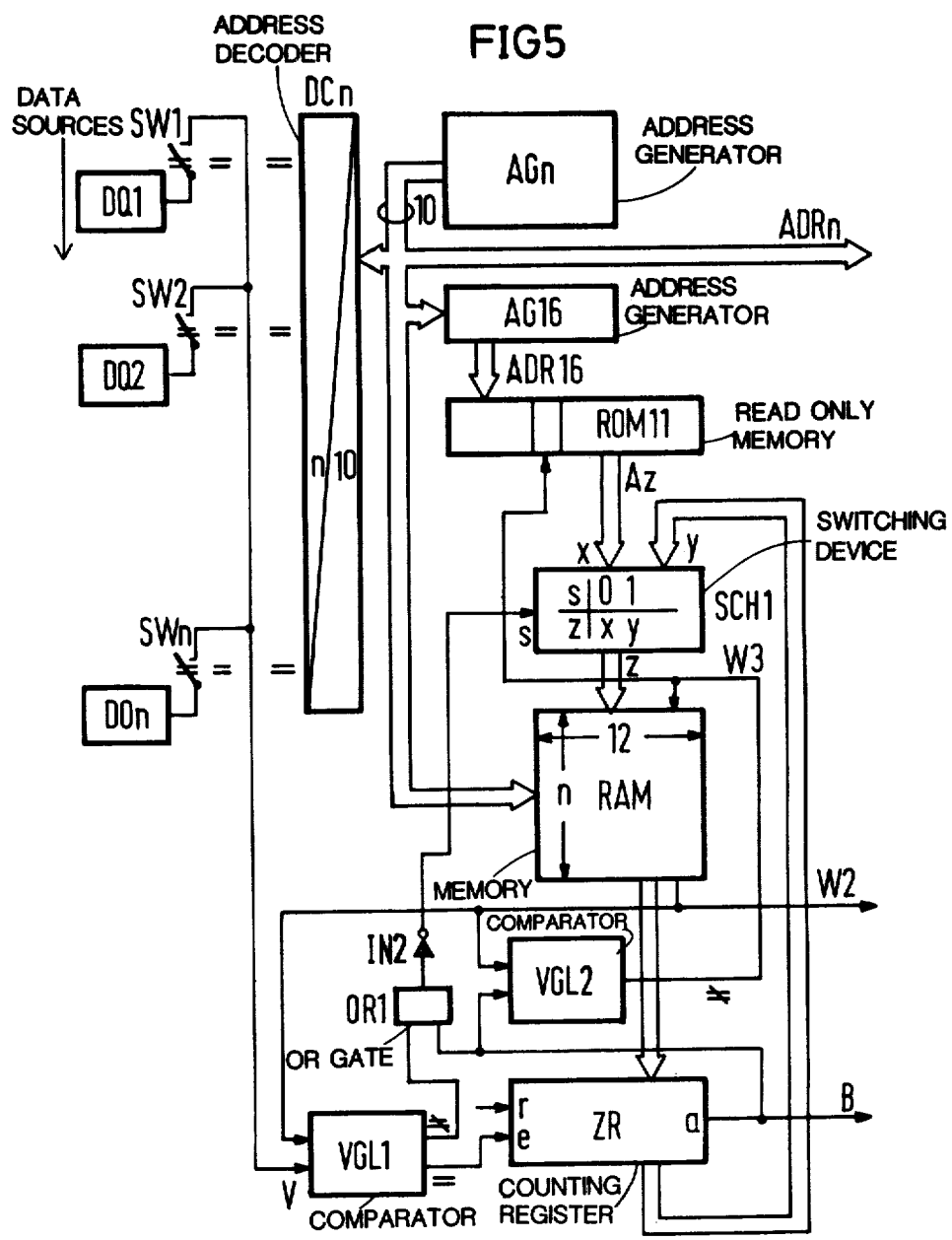

CIRCUIT ARRANGEMENT FOR THE RECOGNITION OF PREDETERMINED BINARY VALVES OF A SPECIFIC MINIMUM DURATION

BACKGROUND OF THE INVENTION

1. Field of the Invention

The present invention relates to a circuit arrangement for recognizing predetermined binary values of a specific minimum duration which are emitted to a common data line from a plurality of data sources by way of a respective switch.

2. Description of the Prior Art

Teleprinters, for example, can be provided as data sources, particularly when they are connected within the framework of a time division multiplex system. If, given these conditions, a teleprinter emits a "1" signal during the interval of at least 50 ms, then it signals a call request therewith. With the present circuit arrangement, for example, such call requests can be perceived and can be signaled with a single respective recognition signal. In addition to the teleprinters, magnetic tape scanners, perforate tape readers, punched card readers, measured variables transmitters and other further data sources can be provided, regardless of whether they emit their data in a synchronous or asynchronous manner.

SUMMARY OF THE INVENTION

The object of the present invention is to provide apparatus to signal predetermined binary values of a plurality of data sources when these predetermined binary values are emitted during a specific minimum duration.

The above object is achieved in that an address generator periodically generates data source addresses which are emitted, on the one hand, to a respective counting device and, on the other hand, to an address decoder. The address decoder generates switching signals in accordance with the data source addresses, the switching signals connecting the data sources to the data line by way of a switch. The counting devices assigned counter readings to all data sources, the counter readings being changed in different counting directions given the lack or, respectively, the occurrence, of the predetermined binary values. The counting devices emit recognition signals upon attaining predetermined readings.

The invention is distinguished by the fact that it even signals the predetermined binary values of specific minimum duration with a relatively low technical expense, even when many binary values from a corresponding number of data sources must be signaled.

In particular, in order to be able to construct the counting devices rationally when many data sources exists, it is advantageous that the counting devices be formed of an addressable memory and a counting register. The addressable memory is addressed with the data source addresses. The addressable memory stores the counter readings and emits the same to a counting register by way of its outputs at each call-in of the appertaining data source addresses. The counter readings are changed upon the occurrence of the predetermined binary values and the resulting counter readings of the counting register are regenerated in the addressable memory.

In case only a single, predetermined binary value is, under certain conditions, also to be signaled repeatedly during the duration of its occurrence, it is advantageous that the counting register have a counting input, a reset input and an output. The counting input is connected to the data line. The reset input is connected to the data line by way of an inverter. Also, the recognition signals are emitted by way of the output.

In case the predetermined binary values are meant to be selectable case-by-case, it is advantageous that a comparator be provided which compares the predetermined binary values to selectable binary values. The counter readings of the counting device are changed given equality or, respectively, inequality of the two binary values.

In case both possibilities of binary value changes are to be respectively reported a single time, it is advantageous that the addressable memory store the binary values immediately to be reported, in addition, and assigned to the counter readings. In a further comparator, the binary values to be reported in the binary values of the recognition signals are compared and the binary values derive therefrom, given inequality of the binary values, are input into the addressable memory as the binary values to be reported immediately thereafter.

If, in the recognition of the predetermined binary values, a minimum duration dependent on these binary values is to be taken into consideration, it is advantageous that a read-only memory is provided which stores the initial counter readings and emits initial counter readings as a function of the binary values of the comparative values. A switching unit is provided which, given inequality of the predetermined binary values and the binary values to be reported or given occurrence of the recognition signals, allows the initial counter readings emitted by the read-only memory to pass through to the addressable memory and which, given equality of the predetermined binary values and the binary values to be reported and given non-occurring emission of the recognition signals, allows the resultant counter readings of the counting register to pass through.

In case a number of alternatives with respect to the minimum duration of the predetermined binary values are meant to be possible at each data source, it is advantageous that a further address generator be provided which respectively emits one of a plurality of read-only memory addresses per data source address. The initial counter readings of the read-only memory are addressed with the read-only memory addresses and with the comparative values.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 4, again, is a schematic representation of a circuit arrangement with whose assistance a respective different minimum duration can be assigned to the two possible binary values; and FIG. 5 is a schematic representation of a circuit arrangement with whose assistance various values of the minimum duration per data source can be taken into consideration.

DESCRIPTION OF THE PREFERRED EMBODIMENTS

Figure 1:
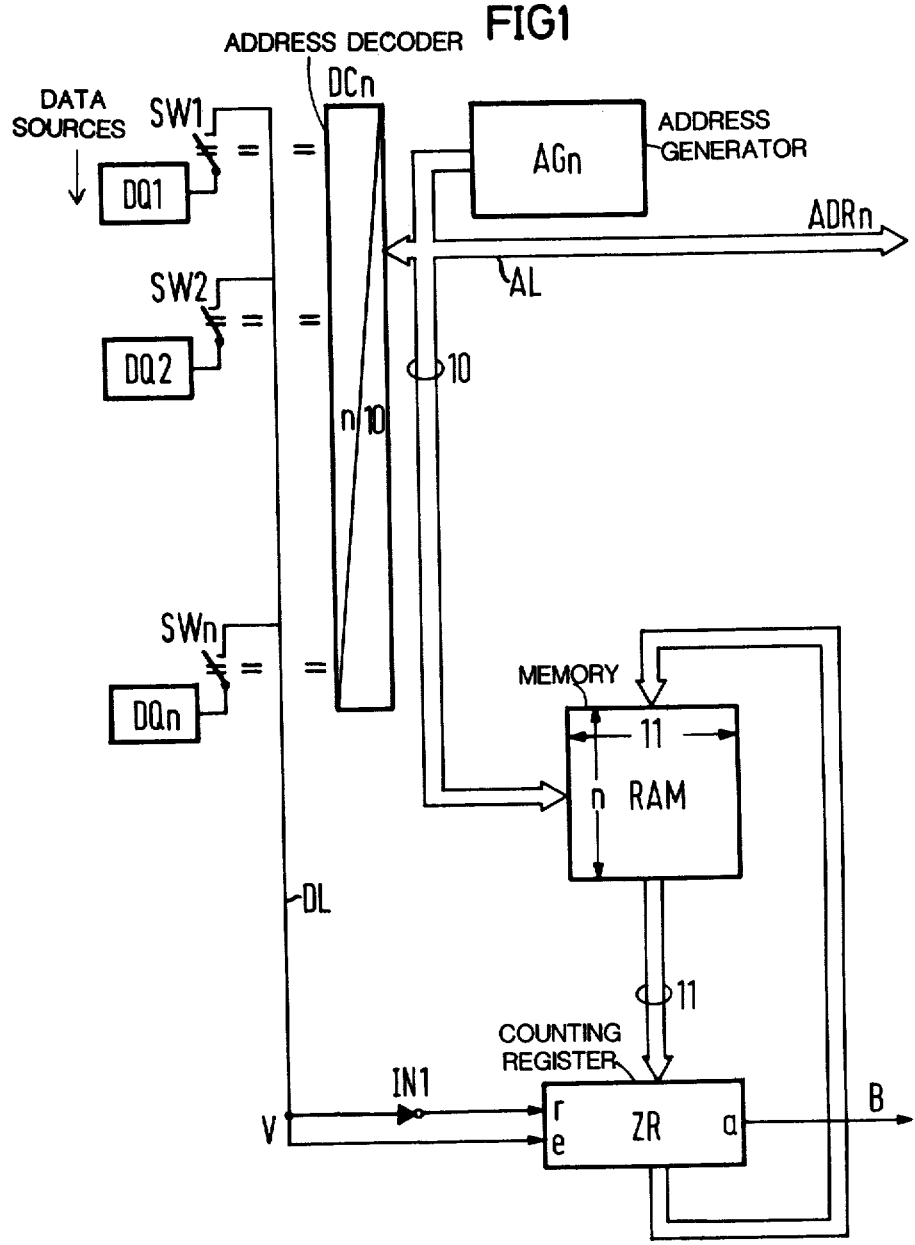
FIG. 1 illustrates, in schematic form, the recognition of a single, predetermined binary value, whereby the same minimum duration is valid for all binary values.

Referring to FIG. 1, a plurality of data sources DQ1-DQn are illustrated. For the sake of a simple presentation, only three data sources are indicated, in contrast whereto hundreds of such data sources can be provided in practice. The respective switches SW1-SWn are assigned to the total number n of data sources. The data sources can be connected to the data line DL by way of the switches.

An address generator AGn generates a respective address ADRn per data source. Altogether, n data source addresses ADRn are emitted by way of the address lines AL in a periodic temporal succession. In this exemplary embodiment, it is assumed that the data addresses ADRn consists of 10 respective bits which are supplied in parallel by way of 10 address lines AL to an address decoder DCn, on the one hand, and, on the other hand to an addressable memory RAM. The number 10 recalls the overall 10 address lines AL.

The address decoder DCn decodes the addresses ADRn supplied thereto and generates, overall, n switching signals with whose assistance the switches SW1-SWn are briefly closed in temporal succession. Upon call-up of one of the addresses ADRn of the address generator AGn, therefore, the data line DL is briefly connected to the addressed data source.

A total of n counting words with 11 bits each are stored in the addressable memory RAM. One of these counting words is assigned to each data source and, upon call-up of an address ADRn, the counting word assigned to the address and the data source is emitted by the memory RAM. The counting words stored in the memory RAM can also be viewed as being counter readings, since the total of n word cells of the memory RAM respectively forms n counting devices, in combination with a counting register ZR. The respective counter readings of these counting devices are stored in the n word cells of the memory RAM. The counter readings stored in the memory RAM are supplied in parallel to the counting register ZR by way of a total of 11 lines. The counting register ZR has a counting input e, a reset input r and an output a. Given a "1" signal at the counting input e, the counter reading of the counting register is increased. With a "1" signal at the reset input r, the counter reading of the counting register ZR is reset to an initial counter reading. Upon attainment of a predetermined counter reading, a recognition signal B is emitted by way of the output a.

The data sources DQ1-DQn respectively emit either "1" values or "0" values. It is assumed that the "1" values are to be signaled in case the same are emitted from a specific data source during a specific minimum duration.

When one of the addresses ADRn is called up, the assigned counter reading is stored in the counting register, the binary value V of the assigned data source is applied at the counting input e, and the binary value of the assigned data source, inverted with the inverter IN1, is applied at the reset input r. If, for example, the data source emits a value V="1", then the counter reading of the counting register ZR is increased by one unit and the increased counter reading is again regenerated in the memory RAM. In case the data source emits a value V="0", then the counter reading of the counting register is reset with the "1" signal at the reset input r and the corresponding initial counter reading is transferred into the memory RAM. If, in the repeated call-ups of one of the addresses ADRn, "1" values are applied over and over at the counting register e, then the counter reading of the counting register ZR is increased until the predetermined counter reading is finally achieved and the recognition signal B is emitted. This recognition signal B indicates that the assigned data source emitted "1" values during a specific minimum duration. The minimum duration depends on the number n, on the duration of the individual addresses ADRn, on the selected initial counter reading and on the selected final counter reading at which the recognition signal B is emitted. For example, the counter reading 00 000 000 000 can be selected as the initial counter reading and the number 11 111 111 111 can be selected as the final counter reading at which the recognition signal B is emitted at the output a as an overflow signal. After delivery of the recognition signal B, the counter reading of the counter ZR is reset to the initial counter reading. In case the appertaining data source emits the "1" values for a sufficient length, the final counter reading can be repeatedly achieved, whereby a recognition signal B is emitted each time.

The n counting devices formed from the memory RAM and the counting register ZR are driven separately for all n addresses ADRn, so that, for example, a recognition signal B assigned to the data source DQ2 is emitted, in contrast whereto recognition signals, assigned to the remaining data source are not emitted. In order to signal to which data source the respectively emitted recognition signal B is assigned, the appertaining address ADRn is emitted simultaneously with the recognition signal B. If, for example, a teleprinter is provided as the data source DQ2 and the minimum duration is set at 50 ms, then the corresponding recognition signal B indicates that the appertaining teleprinter emits "1" signals for a duration of 50 ms and that a call request exists.

Figure 2:
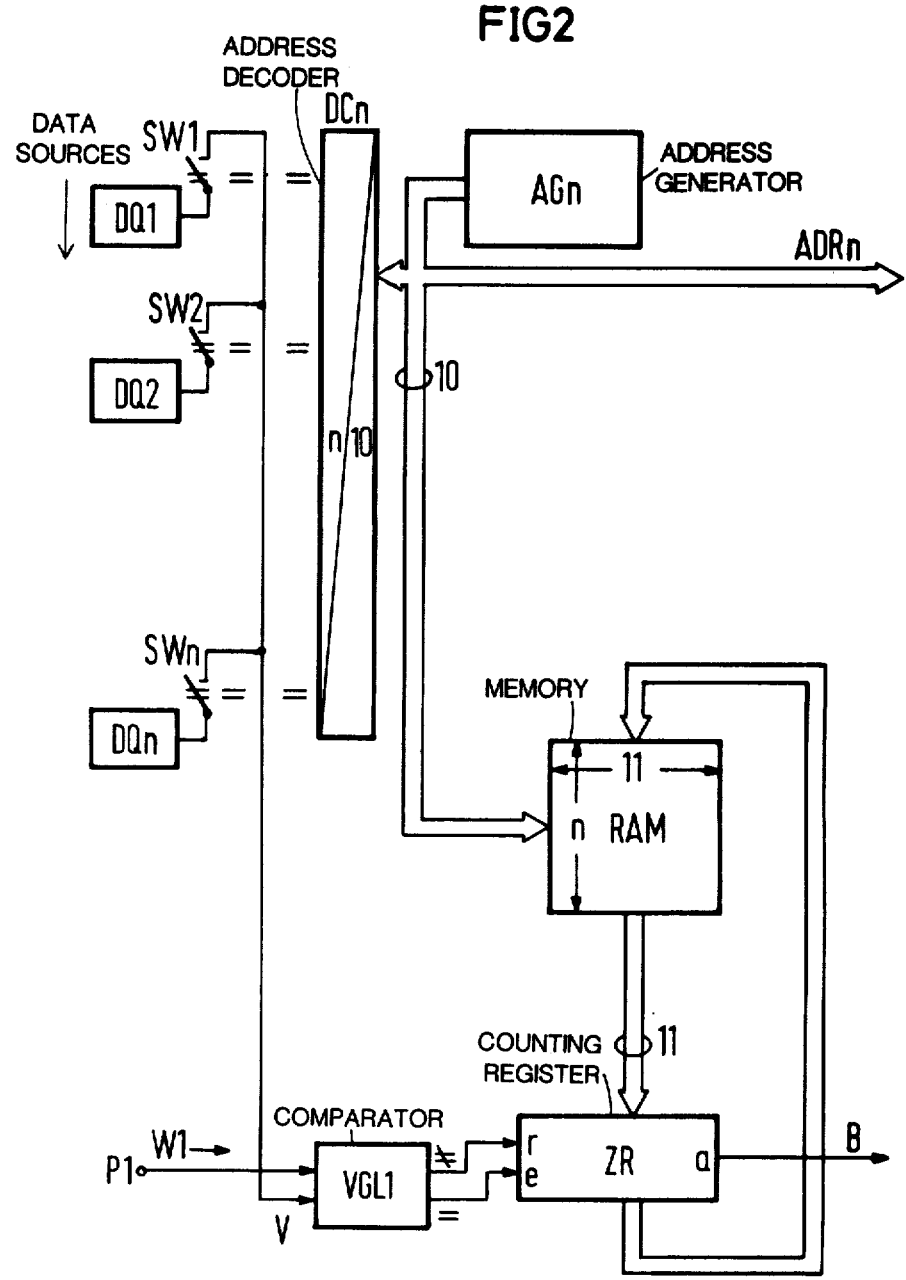
FIG. 2 illustrates, in schematic representation, a circuit arrangement with the assistance of which the predetermined binary values are selectable case-by-case.

According to FIG. 2, a comparator VGL1 is provided in addition to the components illustrated in FIG. 1. The binary values V emitted from the data sources are supplied to one input of the comparator VGL1. By way of a circuit point P1 binary values W1 are connected to a second input of the comparator VGL1. Given equality of the two binary values V and W1, a "1" signal is emitted to the counting input e by way of an output of the comparator. Given inequality of the two binary values V and W1, a "1" signal is emitted to the reset input r by way of the other output of the comparator. The comparator VGR1 renders possible a setting of that binary value to which the circuit arrangement is meant to respond and whose minimum duration the recognition signal B is to be emitted. Given V="1" and W1="1", for example, the counter readings of the counting registers ZR are increased, in contrast thereto, given the values V="0" and W1="1", the counter reading is counted in reverse. The signal W1="1", thus, only the "1" values of the signal V are taken into consideration, in contrast thereto, and given W1="0", "0" values are continuously emitted by way of the circuit point P1, then only the "0" values of the signal V are taken into consideration and a corresponding recognition signal B is only emitted when the "0" binary values are emitted from the assigned data source during a specific minimum duration.

Figure 3:
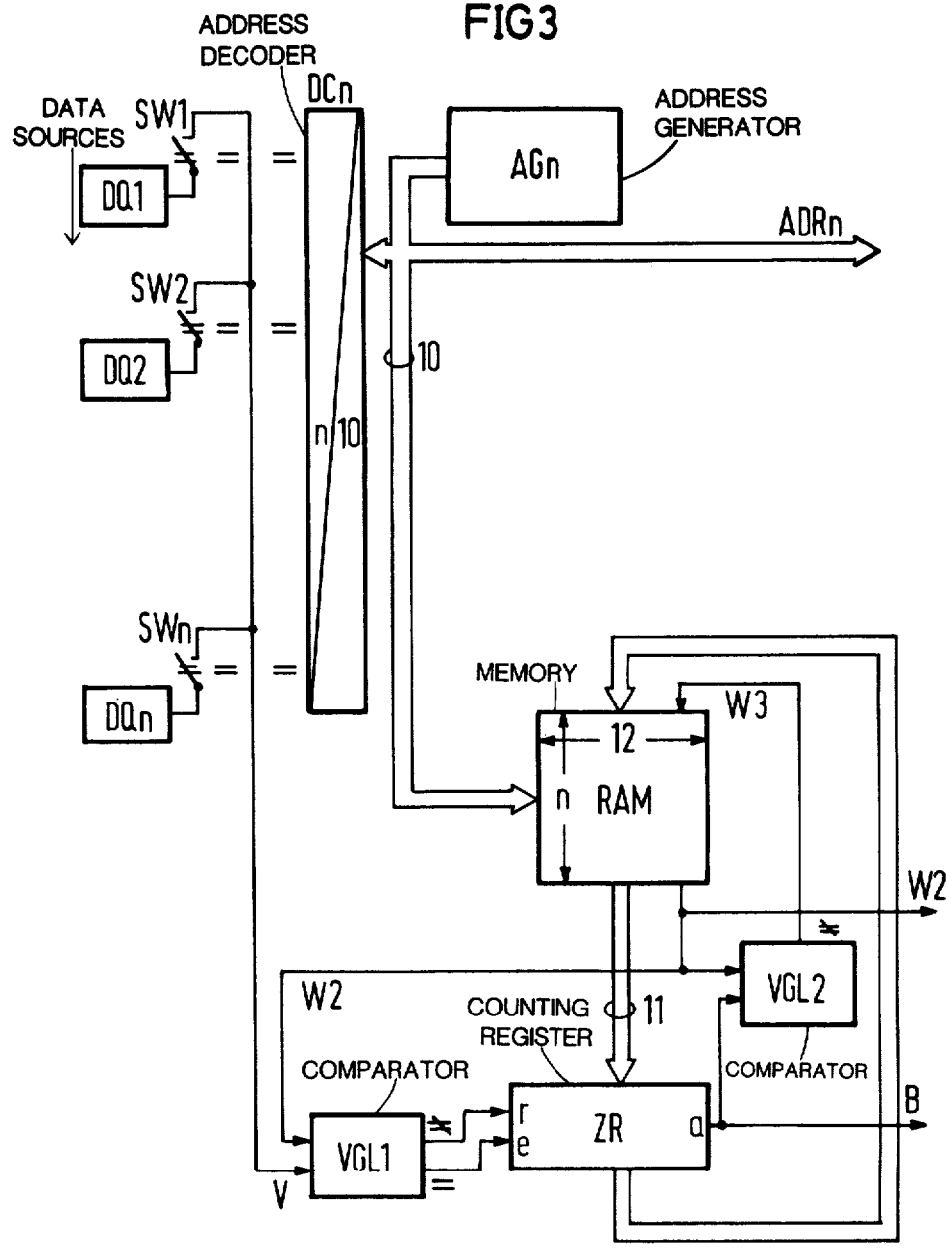
FIG. 3 is another schematic representation of a circuit arrangement with which both possibilities of binary value changes are respectively reported a single time.

In addition to the objects illustrated in FIG. 2, FIG. 3 illustrates a further comparator VGL2 which, given inequality of the two binary values supplied at the input, emits a "1" signal to the memory RAM. In this case, one word is assigned to each address ADRn with the assistance of the memory RAM, the word being formed, on the one hand, with 11 bits from the assigned counter reading and with 1 bit from the assigned binary value of the signal W2. The circuit arrangement illustrated in FIG. 3 indicates both "1" values as well as "0" values of the signal V, should these occur during the predetermined minimum duration. The manner of operation of the circuit arrangement illustrated in FIG. 3 can be seen from the following Table I.

TABLE I

|    | V | W2 | VGL1 | B | VGL2 | W3 | AZ  |
|----|---|----|----|---|----|----|-----|
| 10 | 0 | 0  | =  | 0 | =  | 0  |     |
| 11 | 0 | 0  | =  | 1 | ≠  | 1  | AZ1 |
| 12 | 0 | 1  | ≠  | 0 | ≠  | 1  | AZ1 |
| 13 | 0 | 1  | ≠  | 0 | ≠  | 1  | AZ1 |
| 14 | 1 | 1  | =  | 0 | ≠  | 1  |     |
| 15 | 1 | 1  | =  | 1 | =  | 0  | AZ0 |
| 16 | 1 | 0  | ≠  | 0 | =  | 0  | AZ0 |
| 17 | 1 | 0  | ≠  | 0 | =  | 0  | AZ0 |

According to line 10, Table I proceeds from the fact that, given V="0" and given W2="0", the comparator VGL1 identifies the quality of the two signals and the counter reading of the counting register ZR is increased without, however, attaining its final counter reading. Therefore, the signal B="0" is emitted, so that, by means of comparison of the two signals W2 and B with the assistance of the comparator VGL2, the signal W3="0" follows.

Further, and proceeding from the line 10 through the line 13, the signal V="0" is presumed. The signal W2 equals the signal W3 of the preceding line. According to line 11, the comparator VGL1 identifies the equality of the two signals V and W2 and, upon reaching the final reading, the recognition signal B="1" is emitted from the counting register ZR. By means of the simultaneous emission of the signal W2="0", it is indicated that this recognition signal B="1" relates to the binary signal V="0". By means of the simultaneous emission of the appertaining address ADRn, the appertaining data source is indicated. The comparator VGL2 identifies the inequality of the two binary values W2 and B and emits the signal W3="1".

According to line 12, given inequality of the two signals V and W2, the counter reading of the counting register ZR is set back, in case the initial counter reading is not to be set. Therefore, the signal B="0" is emitted and the signal W3="1".

In case, according to line 13, the binary value V="0" continues to occur, the other binary values do not change. Given this precondition, the final reading of the counting register ZR is no longer attained and the recognition signal B="1", according to line 11, was only emitted a single time.

From the line 14 through the line 17, the signal V="1" is presumed. Given the signal W3="1" according to line 13, there follows the signal W2="1" according to line 14. Given equality of the two binary values V and W2, the counting register ZR counts, but has not yet achieved, its final reading and emits the signal B="0". The comparator VGL2 identifies the inequality of the two signals W2 and B and emits the signal W3="1".

According to the line 15, the counting register reaches its final reading and emits the recognition signal B="1". Due to the simultaneous emission of the signal W2="1", it is indicated that this recognition signal B="1" relates to the binary value V="1". The simultaneously emitted address ADRn again signals the assigned data source. Given equality of the two binary values W2 and B, the comparator VGL2 emits the signal W3="0".

According to the line 16, given inequality of the two binary values V and W2, the counter reading of the counting register ZR is set back and the signal B="0" is emitted. By doing so, there also occurs the signal W3="0" which is not changed as long as the binary value V="1", as is shown in line 17, occurs. Given the recognition signal B="1", therefore, according to the line 15, the transgression of the minimum duration by the binary value V="1" is indicated only a single time.

In addition to the objects of the FIG. 3, FIG. 4 illustrates the read-only memory ROM1, a circuit device SCH1, an inverter IN2 and an OR gate OR1. The signals V, W2, B and W3 are again generated in accordance with Table I.

The circuit device SCH1 receives a control signal s which is obtained with the assistance of the gate OR1 and with the assistance of the inverter IN2. The circuit device SCH1 has 11 inputs x and 11 inputs y. Given the control signals s="0", the 11 inputs x are connected to the 11 outputs z, in contrast whereto, given the control signal s="1", the 11 inputs y are connected to the 11 outputs z. A control signal s="1" also occurs when the signals V and W2 supplied to the comparator VGL1 are equal and when, simultaneously, the signal B="0" is emitted. These are the preconditions to which the lines 10 and 14 of Table I also relate. During the counting of the counting devices, the circuit arrangement illustrated in FIG. 4 operates like the circuit arrangement illustrated in FIG. 3, because the counter readings of the counting register ZR are supplied to the memory RAM via the 11 inputs y and by way of the output z.

When, however, the signals V and W2 are unequal or when the recognition signal B="1" is emitted, then the control signal s="0" occurs. Lines 11, 12, 13, 15, 16 and 17 of Table I relate to these preconditions. Given these preconditions, the initial counter readings Az of the read-only memory ROM1, upon resetting of the counting devices, are supplied by way of the inputs x to the memory RAM by way of the outputs z of the switching device SCH1. Thereby, the read-only memory ROM1 only stores two initial counter readings Az which are addressed with the signal W3. With the signal W3="0", the upper of the two initial counter readings Az0, for example, the word 00 000 000 100 is called up and with the signal W3="1", the lower initial counter reading Az1, for example, the word 00 001 000 000 is called up. In this manner, an initial counter reading which depends on the binary value of the signal W3 is input into the counting devices which are formed from the memory RAM and from the counting register ZR. By so doing, different minimum durations can be set for different binary values of the signals W3 and V. In the present case, it has been assumed that, given a "0" value of the signal V to be reported next, the initial counting reading Az0=00 000 000 100 is set, in contrast whereto, given a "1" value of the signal V to be reported next, an initial counter reading of AZ1=00 001 000 000 is set.

In addition to the circuit arrangement illustrated in FIG. 4, FIG. 5 shows the address generator AG16 which emits an address ADR16 given the existence of one of the addresses ADRn. In this exemplary embodiment, it is assumed that respectively one of 16 addresses ADR16 can be assigned to each address register ADRn. This assignment can depend on the bit rates with which the data of the data sources DQ1-DQn are emitted. If, for example, the data sources DQ1 and DQ2 emit their data with the bit rate B1 and the data source DQn emits its data with the bit rate B2, then one of the 16 addresses ADR16 can be assigned to the addresses ADRn of the data sources DQ1 and DQ2 and another of the 16 addresses ADR16 can be assigned to the address of the data source DQn. A read-only memory which must store n words can be provided as the address generator AG16.

The control signal s for driving the switching device SCH1 is generated in the same manner as in FIG. 4. The read only memory ROM11 corresponds to the read-only memory ROM1 illustrated in FIG. 4. The read-only memory ROM11, however, is driven with addresses of five respective bits. Four bits stem from the addresses ADR16 and the fifth bit is supplied by the signal W3. When, for example, the address ADRn=000 000 000 001 of the data source DQ1 is called up, then the address generator AG16 emits one of the 16 possible addresses, for example, the address ADR16=1010. In this case, the read-only memory ROM11 is addressed with the address 1010 and with the signal W3. In this manner, 16 pairs of initial values can be individually set per data source.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a data transmission system of the type in which a plurality of data sources emit data to a common data line via respective switches, the improvement therein comprising:
   a circuit arrangement for recognizing predetermined binary values of a specific minimum duration, said circuit arrangement including
   an address decoder for receiving and decoding addresses and responsive thereto to selectively operate the switches,
   an address generator connected to said address decoder and operable to periodically generate addresses identifying the data sources, and
   counting means connected to said address generator, said counting means operable to assign a counter reading to each of said data sources and including a forward-backward counter connected to the data line and operable to count in a respective direction in response to the presence or absence of the predetermined binary values and produce recognition signals in response to reaching predetermined counter readings.

2. The improvement of claim 1, wherein said counting means comprises:
   an addressable memory connected to said address generator and to said counter, said addressable memory storing counter readings and operable in response to a data source address to input the respective counter reading into said counter for modification by the predetermined binary values.

3. The improvement of claim 2, wherein said counter comprises:
   a counting input connected to the data line;
   an inverter connected to the data line;
   a reset input connected to the data line via said inverter;
   a multiple input connected to said addressable memory;
   a multiple output connected to said addressable memory; and
   a recognition signal output.

4. The improvement of claim 1, and further comprising:
   a comparator including a first input connected to the data line, a second input connected to receive selectable binary values for comparison with the predetermined binary values, and a pair of outputs connected to said counter for causing a change of the counter reading in response to equality or inequality of two compared binary values.

5. The improvement of claim 4, and further comprising:
   a further comparator including a first input connected to said counter for receiving the recognition signals, a second input connected in common with said second input of the first-mentioned comparator, and an output connected to said addressable memory for inputting a comparison signal in response to inequality of the binary values compared by said further comparator,
   said addressable memory including a report output connected to said second inputs of said comparators to provide the previously input comparison signal as the selectable binary value.

6. The improvement of claim 5, and further comprising:
   a read-only memory storing a first binary word and a second binary word, said read-only memory connected to said output of said further comparator and operable to emit the first or the second binary word in response to the binary value of the comparison signal;
   a circuit connected between said read-only memory and said addressable memory, and between said counter and said addressable memory, and connected to the first-mentioned comparator and to said counter and operable in response to a recognition signal or inequality of the binary values compared by the first-mentioned comparator to load the emitted first or second binary word into said addressable memory as a counter reading.

7. The improvement of claim 6, and further comprising:
   a further address generator connected between the first-mentioned address generator and said read-only memory for emitting a further address per data source to said read-only memory in response to addresses, said read-only memory storing a plurality of counter readings which are addressed by a combination of said further addresses and said comparison signal.

* * * * *